The invention described herein may be manufactured and used by or for the Government of the United States of America for governmental purposes without the payment of any royalties thereon or therefor.

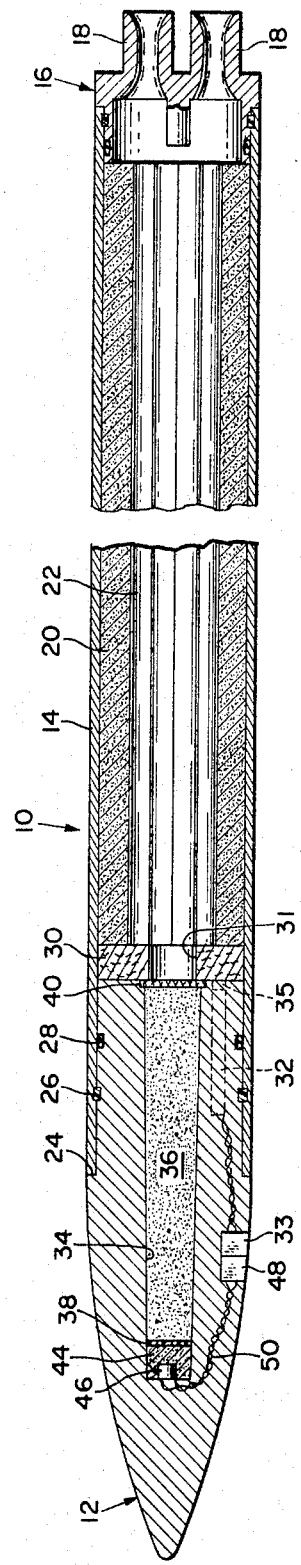
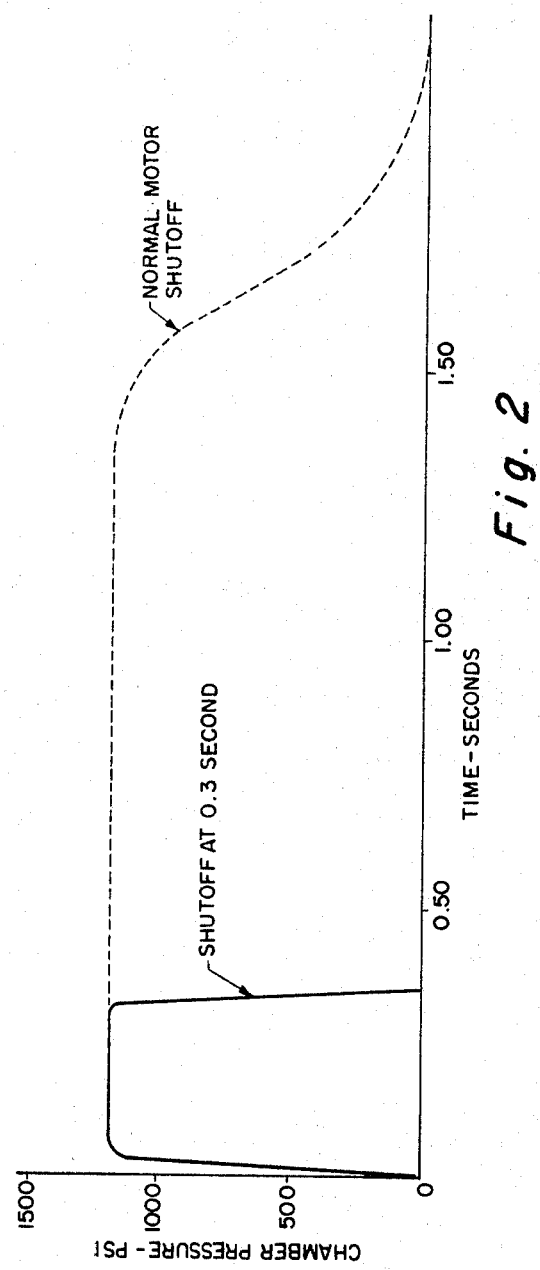
Aug. 16, 1966  C. J. CROWELL, JR., ETAL  3,266,237
CONTROLLED EXTINGUISHMENT AND RE-IGNITION OF SOLID
PROPELLANT ROCKET MOTORS
Filed Sept. 30, 1963
INVENTOR.
CHARLES J. CROWELL JR.
FREDERICK L. HAAKE
BY
ATTORNEY 3,266,237
CONTROLLED EXTINGUISHMENT AND RE-IGNITION OF SOLID PROPELLANT ROCKET MOTORS
Charles J. Crowell, Jr., and Frederick L. Haake, Oxnard, Calif., assignors to the United States of America as represented by the Secretary of the Navy
Filed Sept. 30, 1963, Ser. No. 312,792
8 Claims. (Cl. 60—35.3)

This invention relates to solid propellant motors, and more particularly to a solid propellant rocket motor that can be stopped and restarted at a later time.

There has been a long felt need for a so-called "stop-start" reaction motor since it can vary, as well as increase, the range of the propelled missile; achieve an increased range; and generally provide thrust control of earth bound and space rocket vehicles. There is no problem in achieving these objectives in a missile powered by a liquid propellant motor as the liquid fuel since the oxidizer can be turned off and on at will with relative simplicity by conventional valving.

However, it is obviously not possible to so meter the propellant in a solid propellant rocket motor, and thus the problem of stopping and/or starting such a motor for varying the thrust is a complex one that has long perplexed the art.

This is not to say that there have been no suggested solutions to the "stop-start" problem. U.S. patent 2,956,401 of October 18, 1960 to E. Kane achieves a variable thrust by providing a composite solid propellant grain divided into a plurality of successive separate annular segments, each segment controlled by a respective firing squib and ignition circuit. One or more of the segments can be fired to provide the total thrust requirements for the flight operation within the capability of the composite propellant grain. Such a propellant motor is not without disadvantages since the propellant grain is relatively complex and requires an elaborate firing circuit and selector switch control.

In U.S. patent 3,038,303 issued on June 12, 1962 to R. O. Gose, thrust termination only is achieved in a solid propellant motor by explosively venting the combination chamber to create equal but opposite thrust vectors. Obviously, such a motor cannot be restarted.

In U.S. patent 2,949,009 issued on August 16, 1960 to C. L. D'Ooge, thrust termination only of a solid propellant motor is achieved by quenching, or slowing down, the flame action by flooding the combustion chamber with water. There is no provision for restarting the motor. Laboratory tests have indicated that such a substantial quantity of water is required as to make its practical use an improbability.

We have discovered that quick and effective extinguishment of a burning solid propellant motor can be achieved by exploding a charge of finely divided, free-flowing, particulate matter on to the burning surface of the grain. The extinguishing material which has been found to be satisfactory for this purpose has been the alkali halides and sulphur.

By use of these propellant extinguishing materials, FFAR 2.75 rocket motors, popularly referred to "Mighty Mouse" solid propellant motors have been extinguished in the order of 15 milliseconds after shut-off command. These motors after being extinguished by employment of the invention and have been readily reignited with conventional ignitors.

The precise reasons for the unique effectiveness of these extinguishing materials are not certain. It is believed that these materials undergo a phase change when subjected to the burning surfaces of the propellant grain, and through sublimation or ionization, act as a heat sink to absorb sufficient heat as to instantaneously extinguish the flame on the burning propellant surfaces. In addition to the absorptive qualities of the extinguishing powder or the like, it is likely that it may have a heat reflective property that contributes to effective flame extinguishment. By blasting the finely divided extinguishing material into the propellant grain, there is reason to believe that additional advantages are gained. Firstly, the blasting of the extinguishing powder into the combustion chamber of the solid propellant motor creates a pressure wave that tends to clear the chamber by ejection of the burning matter out through the nozzles, reducing the likelihood of immediate re-ignition.

Secondly, the burning propellant grain normally creates a pressure gradient extending from the burning surfaces of the grain into the flame zone. By blasting the extinguishing material into the combustion chamber this pressure gradient is reversed, enabling the extinguishing powder to adhere to the propellant surfaces. It is possible that this phenomena has the major retarding effect on the burning grain to extinguish burning.

One object of this invention is to vary the thrust of a solid propellant motor.

Another object of this invention is to provide a means for extinguishing a burning solid propellant motor at a predetermined time, and, a corollary object, is to enable such motor to be re-ignited.

Another object is to provide a "stop-start" solid propellant motor having a more efficient shut-off means then herebefore provided.

Other objects, advantages, and novel features of the invention will become apparent from the following detailed description of the invention when considered in conjunction with the accompanying drawings herein;

FIG. 1 is longitudinal sectional view of a typical missile powered by a solid propellant motor employing the "stop-start" feature of the present invention; and FIG. 2 is a pressure-time curve showing the pressure response when the invention is used to stop the motor, as compared with normal burnout.

Referring to the drawing where like reference numerals refer to similar parts throughout the figures, there is shown in FIG. 1 a conventional FFAR 2.75-inch aircraft rocket 10 known as "Mighty Mouse." The conventional warhead has been removed and replaced with a modified nose end 12 that incorporates the novel "stop-start" feature. Rocket 10 comprises an outer motor tube 14 terminating in a nozzle assembly 16 having four nozzles 18, only two of which are illustrated. A solid propellant grain 20 is housed in tube 14, the propellant grain being of the internally burning type having an eight star inner configured bore 22. The rocket motor is fabricated of a standard N5 propellant, although it is understood that the invention is not limited to the use of any particular propellant formulation.

The nose is provided with an annular shoulder 24 on the inner end slidably to receive a corresponding end of rocket tube 14, the assembled telescoping parts being secured by an inter-locking ring 26 with the joint being sealed by O-ring 28. A glass fiber sleeve 30 has a core passageway 31 within the tube adjacent the nose supports and cushions propellant grain 22 and its re-ignitor 32, the latter being controlled by timer 33. Ignitor 32 is sealed in the nose by a retainer 35. Nose end 12 is formed with a central chamber 34 having a longitudinal axis aligned with the longitudinal axis of bore 22 of the propellant grain. For reasons later to be explained, the chamber 34 is preferably frusto-conical in configuration provided with a flaring outwardly toward propellant grain 20, a 2 percent taper having been found to be satisfactory.

A major portion of recess 34 is filled with an extinguisher granular material 36 retained and sealed at both ends by coated cardboard retainers 38 and 40, respectively, the retainers being readily destructible. The details of the extinguisher material will be hereinafter described. The forward end of recess 34 houses a propellant 44 ignitable by a primer 46 and controlled by a timer 48 connected thereto by suitable conductors 50. Propellant 44 serves to blast extinguisher material 36, through cardboard retainers 38 and 40, for broadcast throughout the propellant grain bore 22 to effect an almost instantaneous extinguishment of the burning propellant surfaces. At the same time the blast sweeps the burning propellant particles and gases out through nozzles 18. The effectiveness of extinguishment can be observed in FIG. 2, where a typical pressure decay rate is illustrated. It can be noted that the chamber pressure of approx. 1150 p.s.i. decayed to zero in about 15 milliseconds.

The extinguishing material that has been found to work satisfactory to extinguish a burning solid propellant grain are the alkali halides and sulphur. The following examples are the results of runs on a solid propellant rocket having these characteristics

| | |
|---|---|
| Type | FFAR 2.75″ "Mighty Mouse." |
| Grain type | N5 solid propellant internal burning grain (8 pt. star). |
| Weight of propellant | 5.9 lb. |
| Operating pressure (avg.) | 1200. |
| Total impulse (avg.) | 1176 lb.-sec. |
| Reaction time (avg.) | 1.547 sec. |

The following runs were made on the above-described rocket motors.

Run #43:

| | |
|---|---|
| Extinguisher material | Potassium chloride (+60 Tyler mesh). |
| Explosive propellant | 5 gms. of Hercules Hivel #2 rifle powder. |
| Burning time | 0.288 sec. |
| Operating pressure (avg.) | 1,150 p.s.i. |
| Percent total impulse | 17%. |
| Shutoff delay | 0.013 sec. |

Run #80:

| | |
|---|---|
| Extinguisher material | Sulphur (powder). |
| Explosive propellant | 5 gms. Hivel #2. |
| Burning time | 0.360 sec. |
| Operating pressure (avg.) | 1,100 p.s.i. |
| Percent total impulse | 22%. |
| Shutoff delay | 0.013 sec. |

Run #81:

| | |
|---|---|
| Extinguisher material | Potassium chloride (+60 Tyler mesh). |
| Explosive propellant | 5 gms. Hivel #2. |
| Burning time | 0.362 sec. |
| Operating pressure (avg.) | 1,050 p.s.i. |
| Percent total impulse | 20.9%. |
| Shutoff delay | 0.016 sec. |

Run #85:

| | |
|---|---|
| Extinguisher material | Sodium bromide (+60 Tyler mesh). |
| Explosive propellant | 5 gms. Hivel #2. |
| Burning time | 0.354 sec. |
| Operating pressure (avg.) | 1,100 p.s.i. |
| Percent total impulse | 20.8%. |
| Shutoff delay | 0.013 sec. |

The various tests performed reveal that the extinguishing material 36 should possess certain characteristics in order to be able to extinguish the burning propellant surface without contaminating the surfaces for subsequent re-ignition. The extinguisher material 36 must be chemically stable and inert so as not to react with the propellant or itself. In addition, the extinguisher material must be free flowing so as to be capable of being distributed by the blasting force over a substantial portion of the burning propellant surfaces. In the above described successful tests the size of the particles varied from fine powder, as in the case of the sulphur, and granular (+60 Tyler mesh) as in the case of the alkali halides.

As a practical matter, it is important to keep the extinguisher material dry to avoid caking.

It is believed that one of the most important properties that the extinguisher material must possess is the ability to substantially absorb heat, in other words, it must have a high heat-sink characteristic. This heat-sink property results by the material undergoing a phase change, such as by sublimation, that is able to absorb the heat of the burning propellant and quench the flame. Also, it is possible that ionization occurs in the flame zone to further absorb the heat.

It is believed that the blasting of the extinguishing material by charge 44 into the flame zone has an important contributing factor in the unique extinguishing results obtained. Firstly, the high pressure of the blast ejects the burning propellant particles and gases in the flame zone of the propellant grain bore 22 out through nozzles 18. Secondly, the blast reverses the direction of the pressure gradient, which normally exists from the burning surfaces into the flame zone, which, it is believed, enables the fine extinguisher material to adhere to the hot propellant surfaces. It should be noted that chamber 34 is tapered to provide the blasting force with a "blunderbuss effect," forcing the extinguishing particles outwardly along the hot propellant surfaces.

In the foregoing description we have given several explanations as to the unique results obtained. The exact roll of each of these factors is difficult to ascertain, and it is likely that they each contribute in varying degrees to achieve the novel results. Almost equally important as the ability of the extinguisher material to snuff-out the burning propellant, is that it does not prevent re-ignition of the motor in flight operations where a resumption of thrust is necessary. The alkali halides and sulphur do not have any adverse effect on re-ignition. To re-ignite the partially burned propellant grain all that is necessary is to use a standard pyrotechnic ignitor 32 leading into propellant grain bore 22 and sealed therefrom by a retainer 35. Ignitor 32 is electrically connected by conductors 50 to a timer 33.

The instant invention provides a unique "stop-start" solid propellant motor that is of simple construction. Although the invention has been described with reference to an internal burning solid propellant grain, the use is not so limited, and it can be adapted to an end burning solid propellant grain by re-arrangement of the various components.

It should be noted that the subject invention achieves motor extinguishment without any moving mechanical parts ensuring a high degree of reliability. Motor re-ignition occurs without the need of re-sealing or mechanical porting.

Obviously many modifications and variations of the present invention are possible in the light of the above teachings. It is therefore to be understoood that within the scope of the appended claims the invention may be practiced otherwise than as specifically described.

We claim:

1. A method for extinguishing a burning solid propellant motor which comprises the step of:

subliming into the burning zone of the propellant motor an extinguishing material in granular form selected from the group consisting of the alkali halides and sulphur.

2. A method for extinguishing a burning solid propellant motor which comprises the step of:
sublimbing under pressure into the burning zone of the propellant motor an extinguishing material in granular form selected from the group consisting of the alkali halides and sulphur.

3. A method for extinguishing a burning solid propellant motor which comprises the step of:
coating the propellant surface of the motor with an extinguishing material originally in granular form selected from the group consisting of the alkali halides and sulphur, and reflecting radiant energy from the flame zone by said coating.

4. A method of stopping and starting a burning solid propellant motor which comprises the steps of:
sublimbing the propellant surface under an explosive force,
at least a portion of an extinguishing material in granular form selected from the group consisting of the alkali halides and sulphur; coating said surface with a layer of said extinguishing material to reflect radiant energy from the flame zone and permanently extinguishing the motor, re-igniting the extinguisher propellant motor on command;
whereby a stop-start propellant motor operation is achieved.

5. The combination of a missile having a solid propellant motor:
a chamber provided adjacent said motor;
expendable means separating said chamber from the motor;
extinguishing material in particulate form contained within said chamber; said material having the property of sublimation;
explosive means for blasting said particulate material into said motor for coating to the hot propellant surface;
whereby the extinguishing material through sublimation absorbs the energy of the burning propellant to extinguish the motor.

6. The combination of claim 5 wherein said chamber containing the extinguishing material is tapered flaring outwardly toward the propellant motor.

7. The combination of a missile having a nose end and an exhaust end and a stop-start solid propellant motor of the burning type comprising:
said nose end having a chamber longitudinally aligned and and having outwardly tapered walls leading to the solid propellant motor;
extinguishing material in particulate form taken from the group consisting of the alkali halides and sulphur contained in said chamber;
means for confining said extinguishing material in the chamber;
explosive means for blasting said extinguisher material into the propellant motor;
means for initiating said explosive means;
means for re-igniting said propellant motor;
whereby said extinguishing material extinguishes the motor until re-ignited by command.

8. The combination of a missile having a nose end and an exhaust end, and a stop-start solid propellant motor of the internal burning type comprising:
said nose end having a chamber leading to the solid propellant motor;
extinguishing material in particulate form taken from the group consisting of the alkali halides and sulphur contained in said chamber; said extinguishing material having the property of sublimation;
means for confining said extinguishing material in the chamber;
means for broadcasting said extinguishing material into the propellant motor;
means for re-igniting said propellant motor;
whereby said extinguishing material sublimes when introduced into the motor to extinguish the motor until re-ignited on command.

References Cited by the Examiner

UNITED STATES PATENTS

| 2,346,627 | 4/1944 | Thrune | 169—1 |
| 2,945,344 | 7/1960 | Hutchinson | 60—35.6 |
| 2,949,009 | 8/1960 | D'Ooge | 60—35.6 |
| 3,038,303 | 6/1962 | Gose | 60—35.6 |
| 3,065,597 | 11/1962 | Adamson et al. | 60—35.6 |
| 3,084,506 | 4/1963 | Floyd et al. | 60—35.6 |

FOREIGN PATENTS 492,351   12/1936   Great Britain.

MARK NEWMAN, *Primary Examiner.*

SAMUEL FEINBERG, *Examiner.*

G. L. PETERSON, *Assistant Examiner.*